(12) United States Patent
Krasavin et al.

(10) Patent No.: US 11,438,676 B2
(45) Date of Patent: Sep. 6, 2022

(54) SYSTEM FOR PROVIDING OF INTERACTIVE MEDIA CONTENT TO THE USER'S COMPUTING DEVICE VIA STATIC GRAPHIC MARKER

(71) Applicants: Maxim Anatolyevich Krasavin, Moscow (RU); Vasilii Vasilievich Korolkov, Moscow (RU)

(72) Inventors: Maxim Anatolyevich Krasavin, Moscow (RU); Vasilii Vasilievich Korolkov, Moscow (RU)

( * ) Notice: Subject to any disclaimer, the term of this patent is extended or adjusted under 35 U.S.C. 154(b) by 0 days.

(21) Appl. No.: 17/347,894

(22) Filed: Jun. 15, 2021

(65) Prior Publication Data

US 2021/0392415 A1    Dec. 16, 2021

(51) Int. Cl.
| | | |
|---|---|---|
| *H04N 21/858* | (2011.01) | |
| *G06K 7/14* | (2006.01) | |
| *H04N 21/442* | (2011.01) | |
| *H04N 21/4725* | (2011.01) | |
| *H04N 21/8545* | (2011.01) | |

(52) U.S. Cl.
CPC ....... *H04N 21/8586* (2013.01); *G06K 7/1417* (2013.01); *G06K 7/1443* (2013.01); *H04N 21/44213* (2013.01); *H04N 21/4725* (2013.01); *H04N 21/8545* (2013.01)

(58) Field of Classification Search
CPC ......... H04N 21/8586; H04N 21/44213; H04N 21/4725; H04N 21/8545; G06K 7/1417; G06K 7/1443
See application file for complete search history.

(56) References Cited

U.S. PATENT DOCUMENTS

2014/0090001 A1*    3/2014    Das ................... H04N 21/4725
725/112

FOREIGN PATENT DOCUMENTS

WO    WO-2021183772 A1 *    9/2021    ............. G05B 15/02

* cited by examiner

*Primary Examiner* — Sumaiya A Chowdhury
(74) *Attorney, Agent, or Firm* — Nadya Reingand

(57) ABSTRACT

The invention relates to the field of computing. The invention discloses improvement of the accuracy of providing interactive media content to the user's computing device while providing a simultaneous feedback from the user's computing device to the server for generating and transmitting over-the-air media content. The system for providing interactive media content uses a static graphic marker. The system includes: a remote server for generating on-air media content and transmitting it to a display device, wherein the generation is performed by combining data of the on-air media content with the data of the static graphic marker; a network for receiving and transmitting data from a remote server to a user's computing device; a user's computing device for scanning the static graphic marker, transmitting the scanned data to the remote server, receiving processed interactive media content data and displaying the interactive media content on the user's display.

8 Claims, 1 Drawing Sheet

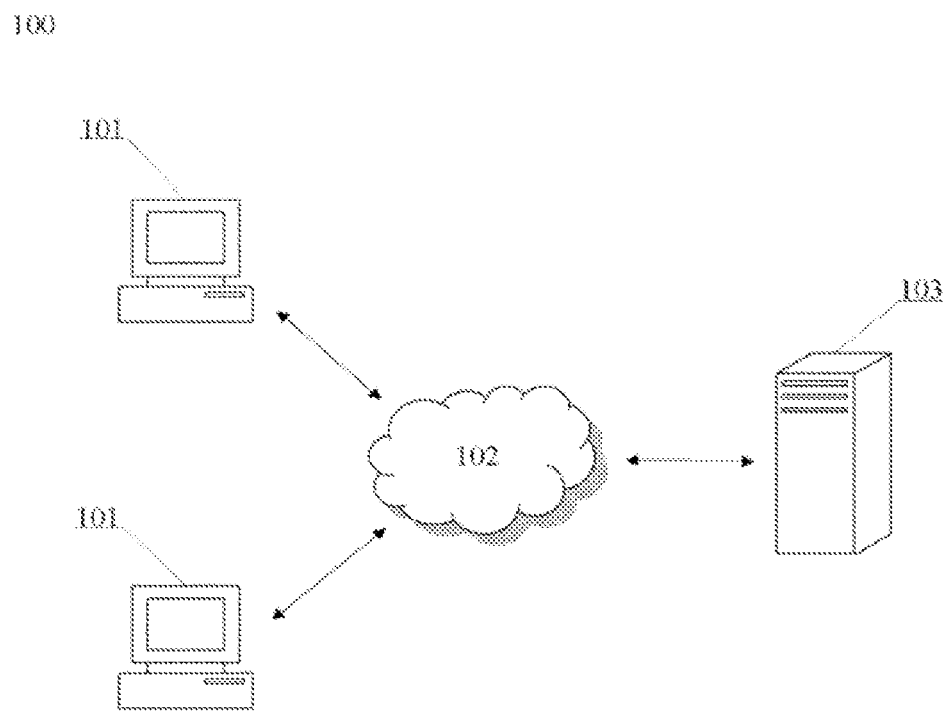

SYSTEM FOR PROVIDING OF INTERACTIVE MEDIA CONTENT TO THE USER'S COMPUTING DEVICE VIA STATIC GRAPHIC MARKER

CROSS-REFERENCE TO RELATED APPLICATIONS

The present patent application claims priority to Russian patent application RU2019111207 filed Apr. 15, 2019.

FIELD OF THE INVENTION

The invention relates to the field of computing techniques for providing interactive media content to a user computing device by using a static graphic marker.

BACKGROUND OF THE INVENTION

There are currently many systems and methods for providing media content to a user computing device. One example of such systems and methods includes a method and system for implementing an interactive television application, which are described in US 2014/0090001 A1. The known solution provides a method and system for designing and implementing synchronized interactive television applications by using a Quick Response (QR) code, with the QR code being used to mark broadcast television content. The method and system are intended for decoding the QR code on the receiver side to provide a universal resource locator (URL) that hosts enhanced services for content on an interactive television as well as on a secondary communication device.

However, the known solution suffers from disadvantages, among which there is a low accuracy of providing interactive media content to the user computing device. This disadvantage is caused by that the known system and method do not involve analyzing the data received from the user computing device.

SUMMARY OF THE INVENTION

It is an objective of the present invention to eliminate the above-indicated disadvantages.

The technical result of the present invention consists in increasing the accuracy of providing interactive media content to a user computing device while providing the possibility of feedback of the user computing device with a server for generating and transmitting broadcast media content.

To achieve the above-indicated technical result, a system for providing interactive media content to a user computing device by using a static graphic marker is provided. The static graphic marker is unchangeable during the provision of the interactive media content to an end user. The system comprises: at least one remote server configured to generate broadcast media content and transmit the generated broadcast media content to at least one display device, said generation being performed by combining data of the broadcast media content with data of at least one static graphic marker; a data receiving and transmitting network configured to connect the at least one remote server with at least one user computing device; the at least one user computing device configured to scan the at least one static graphic marker, transmit scanned data to the remote server, receive processed data of the interactive media content in response to said transmission, and display the interactive media content on the display device of the user computing device.

The processed data include data of an URL link to the interactive media content related to the broadcast media content displayed on the display device when the static graphic marker is scanned, and the interactive media content is displayed on the display device of the user computing device in response to the user computing device navigating to the data of the URL link. The remote server performs, upon receiving the scanned data, an analysis of the scanned data. The analysis includes: determining a time of day at a current geographic location of the user computing device, said determination being further used to provide the interactive media content without rescanning the static graphic marker; determining the broadcast media content displayed when the user computing device scans the static graphic marker; and determining personal user data by reading the personal user data from the user computing device. The remote server generates, based on the analysis, the processed data of the URL link to the interactive media content for their further transmission to the user computing device. The user computing device is configured to send, to the remote server, data related to user interaction with the interactive media content, the data related to the user interaction providing direct or indirect broadcast control.

Additionally, the static graphic marker is at least one of the following codes: a QR code, a Bar code, an alphanumeric code, an image code, or any combination thereof.

Additionally, the personal user data include at least one of the following data: a gender, an age, user preferences, or any combination thereof.

Additionally, the remote server sends, to the user computing device in response to receiving the static graphic marker from the user computing device, a request for providing authentication data by the user computing device, and further performs, in response to receiving the authentication data from the user computing device, the analysis and the generation of the processed data of the interactive media content.

Additionally, the broadcast media content is determined by using a database of the at least one remote server. The database comprises a table of correspondence between an identifier (ID) of the broadcast media content and the scanned static graphic marker.

Additionally, the data receiving and transmitting network is one of the following networks: Internet, Wi-Fi, GPRS, 3G, 4G, 5G, WiMax, a network based on LTE or LTE-A technologies.

Additionally, as a result of the direct broadcast control, the user computing device provides a control action on the broadcast displayed on the display device. The control action is immediate or delayed for a certain period of time.

Additionally, as a result of the indirect broadcast control, the server controls the broadcast displayed on the display device based on user interactions with the interactive media content unrelated to the direct broadcast control.

Obviously, both the previous general description and the following detailed description are given by way of example and explanation only and are not limitations of the present invention.

BRIEF DESCRIPTION OF THE DRAWINGS

FIG. 1 shows a schematic diagram of a system for providing interactive media content to a user computing device by using a static graphic marker.

DETAILED DESCRIPTION OF THE INVENTION

FIG. 1 shows a schematic diagram of a claimed system 100 for providing interactive media content to a user computing device by using a static graphical marker. The system 100 comprises at least one user computing device 101 connected via a network 102 to at least one remote central computing device 103.

The user computing device 101 comprises a processor, a memory, a data input means, a data display device. In this case, the processor is connected to the memory, the data input means and the data display device. The device 101 may be, but is not limited to, a tablet, a smartphone, a laptop, a personal computer. The device 101 is configured to scan at least one static graphic marker, transmit scanned data to the remote server 103, receive processed data of the interactive media content in response to said transmission, and display the interactive media content on the display device of the user computing device. The processed data include data of a URL link to the interactive media content related to broadcast media content displayed on the display device when the static graphic marker is scanned, and the interactive media content is displayed on the display device of the user computing device 101 in response to the user computing device navigating to the data of the URL link. FIG. 1 shows two devices 101 as an example; however, there may be one or more user computing devices. The user computing device 101 is also configured to send data related to user interaction with the interactive media content to the remote server 103. The data related to the user interaction provides direct or indirect broadcast control. As a result of the direct broadcast control, the user computing device provides an immediate or delayed (for a certain period of time) control action on the broadcast. That is to say, the user computing device provides a direct impact on the current broadcast displayed on the display device. As a result of the indirect broadcast control, the server controls the broadcast based on user interactions with the interactive media content unrelated to the direct broadcast control. For example, the data received by the server from the user computing device indicates a desire to reproduce media content related to a particular movie showing. At the same time, the server received the data related to a particular movie showing from several user computing devices. The server may be configured to change, based on these data, the current broadcast to show a particular movie. It should be noted that the data received by the server from the user computing device may be voting data, draw game data and any other data that provide various dynamic broadcast scenarios (the showing of broadcast media content).

The at least one remote server 103 is configured to generate the broadcast media content and transmit the generated broadcast media content to the at least one display device. Said generation is performed by combining the data of the broadcast media content with the data of the at least one static graphic marker. As the display device, at least one of the following devices may be implied: a TV set, a cinema screen, or any other device capable of displaying media content. In response to receiving the scanned data, the server 103 performs their analysis including: determining the time of day at a current geographic location of the user computing device, determining the broadcast media content displayed when the user computing device scans the static graphic marker, and determining personal user data by reading them from the user computing device. Said determination is used further to provide the interactive media content without rescanning the static image marker. By using this analysis, the remote server 103 generates the processed data of the URL link to the interactive media content for their further transmission to the user computing device 101. The broadcast media content is determined by using a database of the at least one remote server 101. The database comprises a table of correspondence between an identifier (ID) of the broadcast media content and the scanned static graphic marker.

The devices 101, as well as the server 103, are connected to each other via a data network 102. The network 102 may be one of the following networks: Internet, Wi-Fi, GPRS, 3G, 4G, 5G, WiMax, a network based on LTE or LTE-A technologies.

In the context of the present invention, the personal user data may include at least one of the following data: a gender, an age, user preferences, or any combinations thereof. In this case, the personal data may be accessed only in case of a user permission in the user computing device 101.

When performing the above-mentioned determination of the personal user data, the server 103 uses collected information to provide the interactive media content in accordance with its relevance. Let us now give one example of providing the interactive media content in accordance with its relevance. If a user specifies all indicators, and the indicators coincide with the provided interactive media content, then the server 103 assigns this media content a value of 100. If the user does not specify any of the requested indicators of the personal data, or if the indicators do not fully coincide with the provided interactive media content, the server assigns this media content a value of 0. If there is a gender coincidence, the server assigns the interactive media content a value of 30. If there is an age coincidence, the server assigns the interactive media content a value of 50. If there is a coincidence of user preferences, the server assigns the interactive media content a value of 20. The server 103 sorts the interactive media content in accordance with the assigned values: the media content having a value of 100 is placed at the beginning of a list, and the content having a value of 0 is placed at the end of or completely excluded from the list of providing the interactive media content to the user computing device.

In the context of the present invention, the static graphic marker may be at least one of the following codes: a QR code, a Bar code, an alphanumeric code, an image code, or any combination thereof.

In the context of the present invention, the remote server may also send, to the user computing device in response to receiving a static graphic marker from the user computing device, a request for providing authentication data by the user computing device, and may further perform, in response to receiving the authentication data from the user device, the above-mentioned analysis and the above-mentioned generation of the processed data of the interactive media content. This request for providing the authentication data by the user device is sent by the server only if the broadcast media content on the display device is related to the streaming provision of the broadcast media content.

Although the present invention has been shown and described with reference to certain embodiments thereof, those skilled in the art will appreciate that various changes and modifications can be made therein without departing from the actual scope of the invention.

The invention claimed is:

1. A system for providing interactive media content to a user computing device by using a static graphic marker, wherein the static graphic marker is unchangeable during the provision of the interactive media content to an end user, and wherein the system comprises:
   at least one remote server configured to generate broadcast media content and transmit the generated broadcast media content to at least one display device, said generation being performed by combining data of the broadcast media content with data of at least one static graphic marker;

a data receiving and transmitting network configured to connect the at least one remote server with at least one user computing device;

the at least one user computing device configured to scan the at least one static graphic marker, transmit scanned data to the remote server, receive processed data of the interactive media content in response to said transmission, and display the interactive media content on the display device of the user computing device, the processed data including data of an URL link to the interactive media content related to the broadcast media content displayed on the display device when the static graphic marker is scanned, and the interactive media content is displayed on the display of the user computing device in response to the user computing device navigating to the data of the URL link, wherein the remote server performs, upon receiving the scanned data, an analysis of the scanned data, the analysis including:

determining a time of day at a current geographic location of the user computing device, said determination being further used to provide the interactive media content without rescanning the static graphic marker;

determining the broadcast media content displayed when the user computing device scans the static graphic marker; and determining personal user data by reading the personal user data from the user computing device;

wherein the remote server generates, based on the analysis, the processed data of the URL link to the interactive media content for their further transmission to the user computing device; and wherein the user computing device is configured to send, to the remote server, data related to user interaction with the interactive media content, the data related to the user interaction providing direct or indirect broadcast control.

2. The system of claim 1, wherein the static graphic marker is at least one of the following codes: a QR code, a Bar code, an alphanumeric code, an image code, or any combination thereof.

3. The system of claim 1, wherein the personal user data include at least one of the following data: a gender, an age, a user preference, or any combination thereof.

4. The system of claim 1, wherein the remote server sends, to the user computing device in response to receiving the static graphic marker from the user computing device, a request for providing authentication data by the user computing device, and further performs, in response to receiving the authentication data from the user computing device, the analysis and the generation of the processed data of the interactive media content.

5. The system of claim 1, wherein the broadcast media content is determined by using a database of the at least one remote server, the database comprising a table of correspondence between an identifier (ID) of the broadcast media content and the scanned static graphic marker.

6. The system of claim 1, wherein the data receiving and transmitting network is one of the following networks: Internet, Wi-Fi, GPRS, 3G, 4G, 5G, WiMax, a network based on LTE or LTE-A technologies.

7. The system of claim 1, wherein, as a result of the direct broadcast control, the user computing device provides a control action on a broadcast displayed on the display device, the control action being immediate or delayed for a certain period of time.

8. The system of claim 1, wherein, as a result of the indirect broadcast control, the server controls a broadcast displayed on the display device based on user interactions with the interactive media content unrelated to the direct broadcast control.

* * * * *